Dec. 9, 1958     H. J. SNOW ET AL     2,863,493
METHOD AND APPARATUS OF FORMING AND PROCESSING FIBERS
Filed May 25, 1955     3 Sheets-Sheet 1

INVENTORS
HENRY J. SNOW
ROBERT W. KENDRICK
BY
ATTYS.

Dec. 9, 1958 H. J. SNOW ET AL 2,863,493
METHOD AND APPARATUS OF FORMING AND PROCESSING FIBERS
Filed May 25, 1955 3 Sheets-Sheet 2
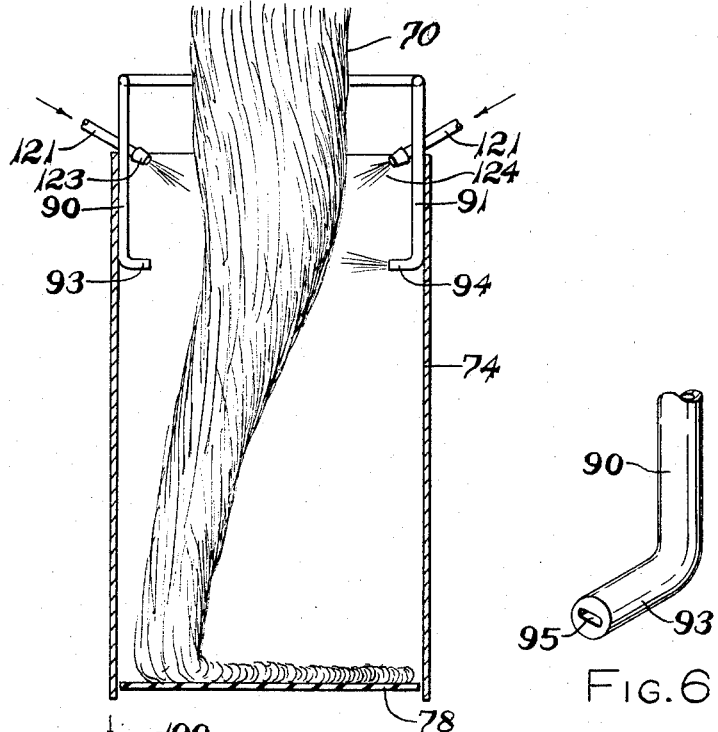
FIG. 2
FIG. 6
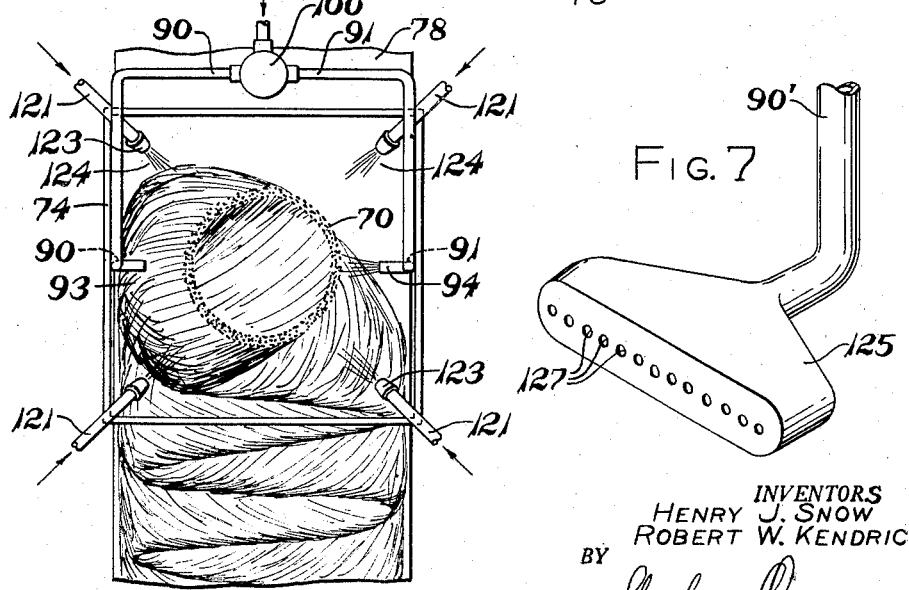
FIG. 3
FIG. 7
INVENTORS
HENRY J. SNOW
ROBERT W. KENDRICK
BY
ATTYS.

United States Patent Office 2,863,493
Patented Dec. 9, 1958

2,863,493

METHOD AND APPARATUS OF FORMING AND PROCESSING FIBERS

Henry J. Snow and Robert W. Kendrick, Newark, Ohio, assignors to Owens-Corning Fiberglas Corporation, a corporation of Delaware Application May 25, 1955, Serial No. 510,946

19 Claims. (Cl. 154—29)

This invention relates to method and apparatus for forming fibers from heat-softenable materials and more especially to a method and apparatus for forming fibers from heat-softenable mineral materials, such as glass, slag or fusible rock.

Commercial manufacture of fibers from molten glass or similar mineral materials has been carried on by subjecting the softened material to high velocity gaseous blasts which draw out or attenuate the material to fibers. Steam and compressed air blasts have been used for producing relatively coarse fibers and very fine glass fibers have been produced by utilizing a gaseous blast formed of intensely hot gases projected from a combustion chamber as an attenuating force.

In the latter method, primary filaments or rods of glass are advanced endwise into a generally rectilinear blast, the heat of the gases of the blast softening the advancing filaments or rods to attenuating temperatures and the softened material attenuated into fine fibers by the velocity of the gases of the blast.

Developments have been more recently carried on wherein centrifugal forces are utilized for delivering bodies of glass into an annularly shaped gaseous blast which attenuates the bodies to fine fibers.

In carrying out this method, the heat-softened material is delivered into a rotor or spinner operating at high speed, the material being directed outwardly through openings in the periphery of the rotor as individual bodies delivered generally radially of the rotor into the annular blast. The blast attenuates or draws the primaries or bodies of glass into fine fibers moving with the gases of the blast in a generally cylindrical shape or pattern usually referred to as a beam of fibers.

The fibers of the beam moving downwardly under the influence of movement of the gases of the blast and gravitational forces have been collected upon a substantially horizontally disposed endless belt. The mass of collected fibers is not uniform in thickness, having alternately thin and thickened zones and hence a mat formed therefrom is not a commercially acceptable product. Mats of this character have poor sound attenuating characteristics and comparatively low heat insulating factors.

The present invention embracs a method of changing or modifying the normal path of travel and the shape of the beam of fibers adjacent the fiber collecting zone whereby the deposition or collection of the fibers may be controlled to form a mat of substantially uniform thickness throughout its entire area.

Another object of the invention is the provision of a method of attenuating mineral material to fibers wherein the fibers are grouped in a generally cylindrical or tubular formation and modifying the path of travel of the tubular formation of fibers in a manner whereby a reorientation of the fibers is effected during collection thereof providing a fibrous mat of substantially uniform thickness having improved strength, heat insulating and sound attenuating characteristics.

Another objpect of the invention resides in a method of forming attenuated fibers in a hollow beam configuration and at a collecting zone, folding or lapping the beam or portions of the beam of fibers upon itself to form a laminar-like mat or product.

Another object of the invention resides in a method of collecting fibers of a downwardly moving beam of fibers upon a continously movable surface in a manner to effectively cause the deposition of the fibers in strata or superposed layers whereby a mat is formed wherein substantially none of the fibers extend from one planar surface of the mat to the other to improve thereby the heat insulating characteristics of the mat.

Another object of the invention resides in a method of engaging a continuously moving beam of fibers by laterally directed forces or gaseous blasts to cause a lapping or folding of the beam of fibers upon itself to form a mat of substantially uniform density throughout its area.

Another object of the invention is the provision of apparatus embodying means for directing gaseous blasts or jets of air into impinging engagement with a zone or zones of a beam of fibers to effect a partial collapsing of the beam of fibers and thereby modify or change the orientation of the fibers formation concomitantly with the collection of the fibers into mat to improve the characteristics of a mat formed from the beam of fibers.

Another object of the invention is the provision of means for oscillating a beam of fibers in a suspended condition in order to facilitate collection of the beam of fibers in a mat formation of laminar character, the apparatus including means for effectively and efficiently distributing a fiber coating or bonding material on the fibers of the beam whereby the mat formed from the coated fibers may be cured or treated to impart mass integrity to the fibrous mat.

Another object is the provision of apparatus for forming two or more hollow cylindrically shaped patterns or beams or fibers in juxtaposed relation and engaging the beams of fibers by forces effective to modify the normal paths of movement of the beams of fibers and collecting the fibers thereof in a manner providing a laminar-like mat of substantial width and of substantially uniform thickness.

Still another object of the invention is the provision of an arrangement for forming fibers in a plurality of suspended beams of fibers which during their movement toward a collecting zone are subjected to laterally directed, alternately acting forces to form a mat having laminar characteristics wherein the beams of fibers in the collected condition lie in superposed echelon relation.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 2 is a vertical sectional view taken substantially on the line 2—2 of Figure 1;

Figure 3 is a plan view taken substantially on the line 3—3 of Figure 1;

Figure 4 is a vertical sectional view through a rotary valve mechanism for controlling the operation of gaseous blasts for oscillating the beam or beams of fibers;

Figure 5 is a detail sectional view taken substantially on the line 5—5 of Figure 4;

Figure 6 is an isometric view ilustrating a form of orifice or nozzle construction forming a part of the apparatus;

Figure 7 is an isometric view illustrating another form of nozzle or orifice construction;

Figure 1:
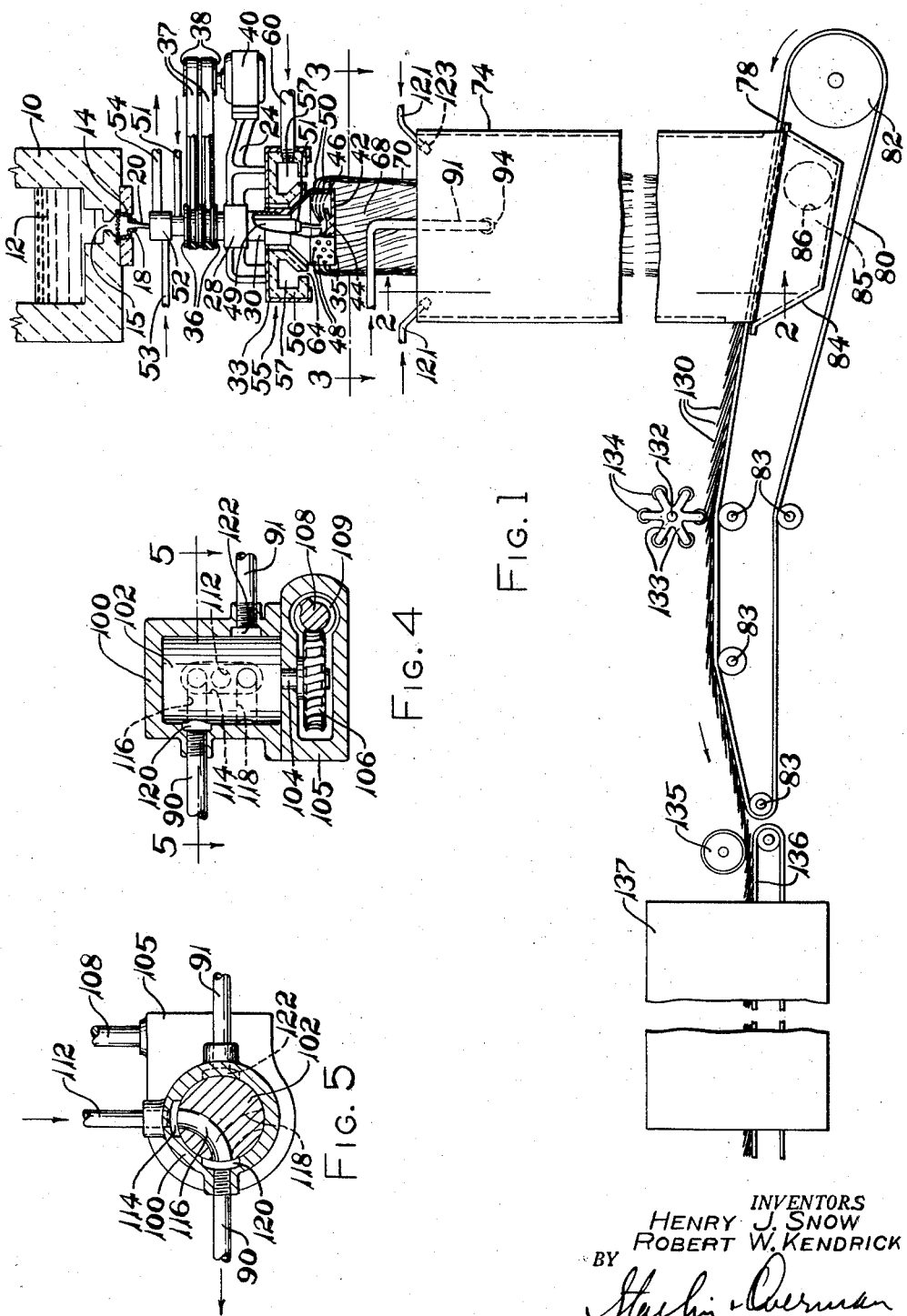
Figure 1 is a semidiagrammatic view of an apparatus for carrying out the method of the invention, certain parts being shown in section.

While the illustrated method and apparatus are particularly adapted for processing beams of attenuated glass fibers into mat formation, it is to be understood that the method and apparatus may be utilized with other kinds of fibers or for any purpose for which the apparatus may be found to be adaptable.

Referring to the drawings in detail and first with respect to the form of the invention shown in Figures 1 through 6 inclusive, there is illustrated an apparatus for forming fine fibers from heat-softenable mineral material, such as glass, into a substantially hollow cylindrical configuration or beam of fibers and collecting the fibers to form a mat. The apparatus is inclusive of a forehearth 10 connected with a melting furnace or tank (not shown) in which glass batch or other fiber-forming material or composition is reduced to a molten or flowable state by the application of heat.

The molten material from the melting furnace flows into the forehearth 10 providing a supply of fiber-forming material 12 in the forehearth. Disposed beneath and in engagement with the bottom wall of the forehearth is a feeder or bushing 14 in registration with a channel 15 formed in the bottom wall of the forehearth and through which the material 12 flows into the feeder. In the embodiment illustrated, the feeder is provided with a single orifice or outlet through which a stream 20 of the molten fiber-forming material is discharged.

Disposed beneath the forehearth 10 is an apparatus for forming the material of the stream by centrifugal forces into a plurality of elongated bodies or primaries which are attenuated by suitable forces into fine fibers which move away from the attenuating zone in the form of a hollow column or beam of fibers. The fiber-forming apparatus is supported upon a frame 24 or other suitable means, the frame being formed or equipped with a hollow boss 28 which encloses suitable antifriction bearings (not shown). The bearings in the boss portion 28 journally support a shaft 30 for rotation about a substantially vertical axis.

The lower end zone of the shaft 30 is threaded or otherwise formed to receive a hub 33 of a rotatable member, rotor or spinner 35. The rotor or spinner is supported by and is rotatable with the shaft 30. The shaft 30 is provided with pulleys or sheaves 36 which are connected by belts 37 with sheaves or pulleys 38 driven by a motor 40 or other suitable means supported on the frame 24 as illustrated in Figure 1.

Suitable means is provided in the rotor 35 for directing the stream of glass into a peripheral zone thereof. In the embodiment illustrated, the rotor 35 is formed with a bottom wall 42 equipped with a plate or member 44. The stream 20 of glass or other heat-softened fiber-forming material flows through the hollow shaft 30 and falls onto the plate or member 44. The rotor 35 is driven at a comparatively high speed of 3000 R. P. M. or more and the material of the stream 20 impinging upon the plate 44 is moved outwardly by centrifugal forces into contact with a peripheral wall 46 of the rotor, the wall 46 being formed with a comparatively large number of small openings 48. The softened fiber-forming material at the peripheral zone of the rotor is projected outwardly through the openings 48 under the influence of centrifugal forces of rotation forming primary filaments or elongated bodies 50 adapted to be engaged by forces effective to attenuate the bodies to fine fibers.

Under certain operating conditions, it may be desirable to provide additional heat for maintaining fiber-forming material in the rotor at elevated temperatures and for starting purposes. To this end a tubular burner 49 may be disposed within the shaft 30 having openings in the lower end for discharging hot gases into the rotor resulting from burning a combustible mixture in the burner. The burner is formed with a passage to accommodate the stream 20 of glass and combustible mixture may be admitted to the burner 49 through a tube 51.

The arrangement may be provided with a cooling jacket 52 having inlet and outlet tubes 53 and 54 for conveying a coolant such as water into and away from the jacket 52. In the preferred embodiment, the primaries or elongated bodies 50 are engaged by an attenuating blast of intensely hot gases at temperatures exceeding the softening temperature of the fiber-forming material and moving at high velocities. As shown in Figure 1, an internal combustion burner 55 is supported by the frame 24 which is of generally annular shape surrounding the upper zone of the rotor construction.

The burner is lined with refractory 56 forming an annular chamber 57 adapted to burn a combustible mixture substantially completely in the confined zone provided by the chamber. One or more tubes or pipes 60 are arranged to deliver a combustible mixture of fuel gas and air into the chamber 57. It is preferable to provide a fire screen (not shown) at the zone of entrance of the tube or tubes 60 into the chamber in order to avoid preignition in the mixture supply tubes.

The burning gases in the chamber 57 undergo great expansion and the burned gases or products of combustion are discharged at high velocities through a restricted orifice 64 which is of annular shape arranged substantially concentric with the peripheral wall 46 of the rotor. The heat of the gases further softens the primaries or elongated bodies 50 which are advanced endwise by centrifugal forces into the blast, and the softened material attenuated to fibers 68 by the velocity of the gases of the blast. Fuel gas, such as methane, propane, or butane, may be utilized as the combustible in the burner. The fuel and air mixture is introduced into the chamber 57 under comparatively low pressures of from three to ten pounds per square inch.

The chamber 57 may be subdivided by radial partitions (not shown) into compartments and combustible mixture burned in each of the compartments. The products of combustion or burned gases from the compartments may be discharged through arcuately shaped slots arranged in a circle providing a substantially annular blast. The gaseous blast draws the primary filaments or elongated bodies into very fine fibers of varying lengths of from a few inches to substantially continuous fibers. Due to the slightly curved path traversed by the primaries or elongated bodies as they move from the peripheral wall 46 into the attenuating blast, the attenuated fibers travel away from the zone of attenuation in a slightly spiral path in the pattern or shape of a hollow cylinder or beam 70 of fibers.

In the illustrated embodiment, the rotor 35 is preferably from six to ten inches in diameter and the hollow cylinder or beam of fibers may be from eight to eighteen inches or more in diameter depending upon the relation of the attenuating blast to the primaries as well as the dimensional characteristics and relative location of the restricted orifice through which the gases of the blast are projected.

The beam of fibers 70 is directed downwardly under the influence of gravity and the velocity of gases of the attenuating blast into a substantially rectangular hood or closure 74 which may be formed of sheet metal. The fibers of the beam 70 are collected upon the upper flight 78 of an endless conveyor 80 of foraminous character which is supported by rolls 82 and 83, the roll 82 being driven by a motor (not shown) to move the upper flight 78 of the conveyor in a lefthand direction as viewed in Figure 1.

Disposed beneath and in registration with the housing or hood 74 is a sheet metal receptacle 84 providing a chamber 85 which is connected by means of a duct 86 with a suction blower or other source of reduced pressure. The zone of reduced pressure provided by the chamber 85 assists in collecting and holding the fibers to the surface of the conveyor and conveys away the spent gases of the attenuating blast.

When the beam of fibers moves in a normal path without being affected by other forces, the fibers tend to collect in a pile or mass having a thick central zone and thin edge zones. A mat formed from a fibrous mass of this character would be of nonuniform thickness and density.

The invention involves the application of forces to the beam of fibers for modifying the path of travel of the fibers enabling the collection of the fibers to form a mat having laminar characteristics and which is of substantially uniform thickness and density throughout its entire area. A preferred arrangement includes the impingement of air or gas streams or blasts alternately against spaced zones of the beam of fibers within the hood or enclosure 74 to effect oscillatory movement or transverse reciprocation of the beam of fibers to attain an improved pattern or orientation of the fibers on the collecting surface or flight 78 of the conveyor.

As particularly shown in Figures 1 through 3, tubes or pipes 90 and 91 extend downwardly into the enclosure 74, the tubes being positioned adjacent opposed walls of the closure. The extremities of tubes 90 and 91 are provided respectively with nozzles or jets 93 and 94 which are arranged to project or direct gas streams across the area defined by the hood 74 and at diametrically opposed zones of the beam of fibers 70 as illustrated in Figure 3.

The nozzles, jets or orifices 93 and 94 are adapted to discharge streams of compressed air, steam or other gaseous medium into impinging engagement and alternating in operation to effect a transverse swaying or oscillating movement of the beam of fibers. A suitable valve means is provided for alternately effecting discharge of air streams or gaseous blasts from the nozzles 93 and 94.

As shown in Figures 3, 4 and 5 a valve mechanism including a housing 100 is disposed exteriorly of the casing or closure 74 and the tubes 90 and 91 connected thereto.

Disposed within a bore in the housing 100 is a rotary valve member 102 provided with a shaft 104 on which is mounted a worm gear 106, the latter being disposed in a casing 105 adjacent the valve member 102. A shaft 108 is equipped with a worm 109 enmeshed with the worm wheel 106. The shaft 108 is driven by a motor (not shown) or other suitable driving means.

A pipe or duct 112 is connected with the housing 100 and with a supply of compressed air or other gas under pressure for producing the blasts for reciprocating the beam of fibers. The tube 112 conveys gas under pressure into a channel or chamber 114 elongated in a vertical direction and formed in an inner wall of the valve casing 100. The cylindrical valve member 102 is formed with vertically spaced passages 116 and 118.

The tube 90 is in communication with a chamber 120 formed in the inner wall of the housing 100 and the tube 91 is in communication with a chamber 122 formed in a wall of a housing.

During rotation of the rotary valve 102, the passage 116 registers with chambers 114 and 120 whereby compressed air or other gas under pressure supplied through the tube 112 flows through the passage 116 and tube 90, and is discharged from the nozzle 93 to impinge against one zone of the beam of fibers 70. When the rotary valve has moved through one-half of a revolution, the passage 118 in the rotor 102 establishes communication between chambers 114 and 122 to convey compressed air or other gas through the tube 91 for discharge from nozzle 94 into engagement with a diametrically opposed zone of the beam of fibers.

From Figures 4 and 5 it will be noted that when the passage 116 is in a position effective to direct compressed air through the pipe 90, passage 118 is out of registration with the chambers 114 and 122 so that no air or gas flows through tube 91 and nozzle 94 when an air stream or air blast is being discharged from the nozzle 93. The reverse condition exists when the rotor has been moved through a succeeding one half revolution whereby passage 118 is positioned to convey compressed air to the nozzle 93 for discharge therefrom.

The rate or speed of rotation of the rotary valve 102 is synchronized with the rate of formation of the attenuated fibers and the rate of downward movement of the beam of fibers so as to cause swaying, oscillation or transverse reciprocation of the beam of fibers to effect distribution of the fibers over the width of the conveyor 80.

Figure 2 is illustrative of the modifications of the shape of the beam of fibers and its transition to the lefthand zone of the hood 74 under the impact or impingement of an air blast from the nozzle 94. It should be noted that there is a partial collapsing of the beam of fibers under the influence of the air blast. When the beam of fibers has moved transversely to approximately the position shown in Figures 2 and 3, the air blast from nozzle 94 is interrupted as rotation of valve member 102 moves passage 118 out of communication with chambers 114 and 122, and the passage 116 comes into registration with chambers 114 and 120 to effect discharge of compressed air from nozzle 93.

The beam of fibers, under the influence of an air blast from nozzle 93, is moved or swung toward a righthand position as viewed in Figure 2 causing the beam of fibers to be deposited on the collecting surface 78 in overlapping relation with the fibers deposited upon the advancing collecting surface by the preceding transverse movement of the beam of fibers. Through this method of continuously and successively swinging or reciprocating the beam of fibers in opposed transverse directions at a rate such that the beam of fibers is collected in a series of overlapping zones or folds, there is formed a mat of laminar or laminated character.

The intermittent impingement of the air blasts from the nozzles 93 and 94 upon the beam of fibers partially disrupts the beam of fibers and breaks off or separates strings, tufts or clumps of fibers which are deposited upon the collecting surface in a transverse reciprocating path. Thus while a substantial portion of the beam of fibers remains in a hollow configuration during oscillatory movements, the clumps or strings of fibers broken or separated from the beam are influenced by the air blasts to move in transverse paths and hence are distributed substantially uniformly over the entire width of the collecting surface 78.

Figure 6 illustrates one of the air nozzles, the orifice 95 therein being about one and one-half inches long. While the gas stream or blast from this size of orifice does not result in a substantial fanning out of the air or gas stream, the impingement of the narrow air blast against the beam of fibers is sufficient to cause substantial swaying of the beam of fibers by reason of the tendency of the fibers of the beam to cling or adhere together.

Figure 7 is illustrative of a modified form of orifice for directing a gaseous blast against the beam of fibers. In this form the tube 90' is equipped with a nozzle construction 125 having a hollow interior chamber, the front wall of the nozzle construction is formed with a plurality of spaced orifices or openings 127 through which air or gas under pressure from the nozzle chamber is discharged in a plurality of streams or blasts which, in effect, form a horizontally elongated knife-like blast. It is to be understood that an uninterrupted elongated slot may be formed in the frontal wall of the nozzle construction 125 through which compressed air or other gas under pressure may be discharged.

The orifice construction 125 may be fashioned to provide a blast of any desired width, but it has been found that a blast of a width of from six to eight inches at the zone of discharge from the orifice is satisfactory in moving the beam in alternate transverse directions to form a laminar construction at the collecting zone. The blast is effective to partially collapse the beam with a reduction in the extent of disruption of the beam of fibers into clumps or strings of fibers.

As the beam of fibers is deposited in overlapping layers or folds forming a mat of laminated or laminar character, the fibers at one major face of the mat do not project through to the other major face and hence there are no direct fiber paths extending from one major face to the other which would otherwise foster the direct transmission of heat. Hence the thermal insulating factor as well as the acoustic attenuation characteristics of the mat in accordance with the method of the instant invention are improved as compared with the characteristics of fibrous mats formed by other methods.

When it is desired to produce mats of the beam of fibers having a high degree of mass integrity, a binder or other fiber coating material may be sprayed onto the beam of fibers as it moves downwardly through the closure or housing 74. As particularly shown in Figure 3, binder supply tubes 121 may be disposed adjacent each corner zone of the housing or hood 74 at the upper entrance into the housing or casing. Each of the tubes 121 may be provided with a binder distributing jet or nozzle 123 through which a spray of binder 124 is projected onto the beam of fibers from a plurality of directions. It should be noted from Figure 2 that the binder is applied at the upper zone of the enclosure 74 and preferably above the zone of impingement of the air jets or blasts against the beam for oscillating the same.

Figure 1 illustrates the flight 78 of the conveyor 80 as a collecting surface for the fibers of the beam and showing the beam of fibers assembled in overlapping layers in echelon relation as at 130 before the fiber layers have been compacted to a mat of predetermined thickness. A device for smoothing the layers of fibers into a more compact condition includes a shaft 132 having arms 133. The arms journally support fiber engaging rollers 134, the shaft 132 being driven at a speed and in a direction to bring the rollers 134 into engagement with the fibers of the mass initially collected on the flight 78.

The layers of fibers may be compacted to a mat of desired thickness by means of a sizing roll 135. The compacted mat of fibers may be conveyed onto a second conveyor 136 which carries the mat through a heated oven 137 or other form of curing zone for curing or setting up the binder in the mat of fibers.

Figure 8:
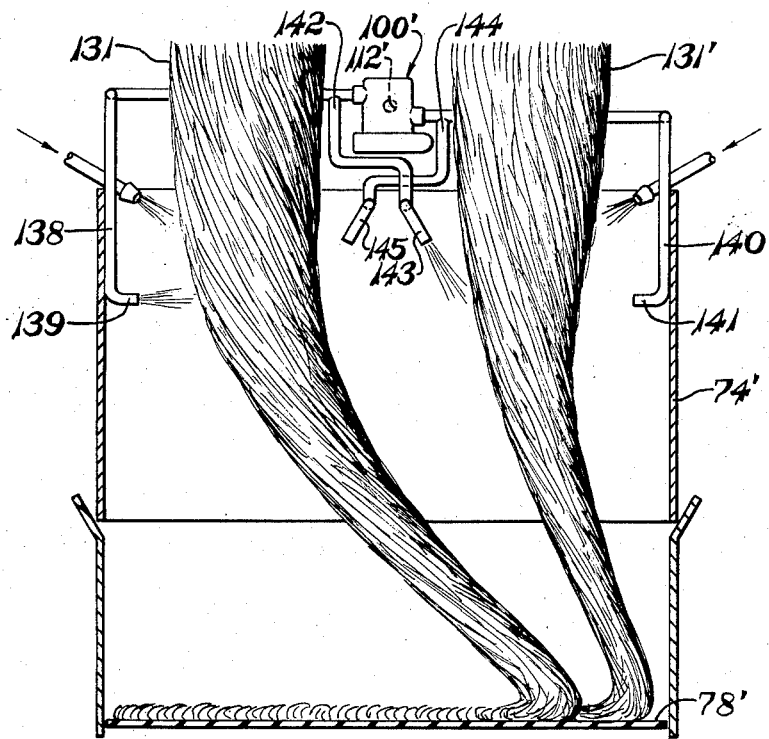
Figure 8 is a vertical sectional view illustrating an apparatus for forming a mat from a plurality of beams of fibers.

Figure 8 illustrates an arrangement whereby two beams of fibers, being formed simultaneously and arranged in transverse alignment, are oscillated or reciprocated in forming a laminar-like mat. The beams of fibers 131 and 131' are each formed from individual fiber-forming means of the character shown in Figure 1. The individual fiber forming means are disposed in adjacent relation and each receives a supply of glass which is attenuated to fibers to form the beams 131 and 131'. A substantially rectangular hood or enclosure 74' is adapted to receive the beams of fibers which are collected upon an upper flight 78' of an endless belt conveyor of the character illustrated in Figure 1.

Means is provided for causing substantially concomitant transverse reciprocation or oscillation of the beams of fibers for lapping the beams into a mat formation. Arranged at the lateral walls or sides of the hood 74' are tubes 138 and 140 provided respectively with orifices or outlets 139 and 141. The tubes 138 and 140 are connected with a valve mechanism 100' which contains rotatable valve means of the character shown in Figures 4 and 5 for directing compressed air intermittently through the tubes.

Connected with tube 138 is a second tube 142 provided with an orifice or nozzle 143, and connected with tube 140 is a tube 144 provided with an orifice 145. Compressed air or other gas is delivered to the rotary valve mechanism through a tube 112'.

The nozzles 139 and 143 are connected together through pipes 138 and 142 and simultaneously receive compressed air from the supply through the valve mechanism 100' for discharge from the nozzles 139 and 143 in impinging relation with the beams of fibers 131 and 131'. It should be noted that nozzle 139 is preferably arranged to project a gaseous blast or air jet against the beam of fibers 131 in a direction transversely of and substantially normal to the movement of the beam of fibers, while nozzle 143 is directed downwardly and is angularly arranged so that the blast emanating therefrom impinges upon the beam of fibers 131' at an acute angle. Thus, as shown in Figure 8, when the nozzles 139 and 143 are operative to direct blasts into engagement with the beams of fibers, both beams of fibers are moved in a righthand direction as viewed in Figure 8.

Nozzles 141 and 145 are connected together through pipes 140 and 144. When the valve means has rotated to a particular position, the blasts from the nozzles 139 and 143 are interrupted and immediately thereafter air blasts from the nozzles 141 and 145 are established to move the beams of fibers 131 and 131' in the opposite direction. Through alternate operation of the pairs of orifices or nozzles producing the air blasts, the beams of fibers are lapped in transverse directions and as the collecting surface 78' is continuously moving, the beams of fibers are overlapped in echelon relation and the layers or laps form a laminated or laminar mat construction.

While two beams of fibers are shown in Figure 8 arranged in transversely aligned relation for forming a laminar-like mat through the transverse reciprocation of the beams, it is to be understood that mats of greater width may be formed by oscillating the beams of fibers through a greater span or stroke or by utilizing additional beams of fibers.

Under certain conditions of operation, as for example, where the beams of fibers are in close relation, the use of air blasts from nozzles 143 and 145 may be eliminated. In this method of operation the air blasts from nozzles 139 and 141 may be increased in velocity by increasing the pressure of the compressed air so that transverse movement of the beam of fibers directly impinged by the air blast is transmitted to the adjacent beam of fibers either by direct contact of the beams of fibers or by air movement between the beams of fibers.

Figure 9:
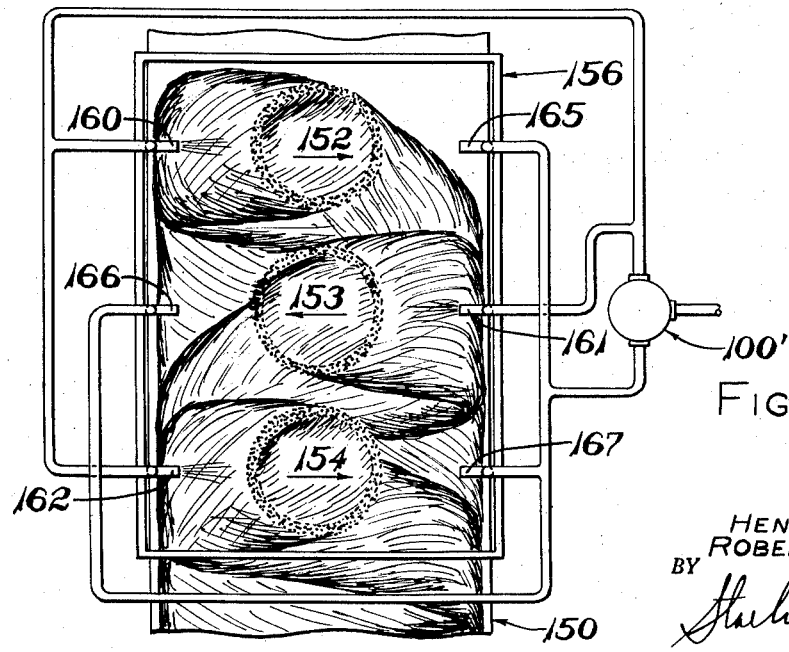
Figure 9 is a semidiagrammatic plan view illustrating a series arrangement of beams of fibers and means for transversely reciprocating the beams of fibers.

A series arrangement of beams of fibers disposed longitudinally of a collecting surface may be oscillated or moved in directions transversely of the fiber collecting surface or conveyor to form a mat construction. An arrangement of this character is illustrated in Figure 9. A plurality of beams of fibers, each beam of fibers being formed by an apparatus of the character illustrated in Figure 1, are arranged longitudinally of an endless belt conveyor 150 which forms a collecting surface. Figure 9 is a plan view showing three beams or tubular columns of fibers 152, 153 and 154, normally aligned centrally of the collecting surface or conveyor 150.

The beams of fibers move downwardly simultaneously through a substantially rectangular enclosure or hood 156. Disposed adjacent and interiorly the side walls of the casing or hood 156 are jets or nozzles through which blasts or streams of compressed air or other gas are directed for causing transverse reciprocation or oscillatory movement of the beams of fibers. A first group of nozzles comprising individual nozzles 160, 161 and 162 are connected together by suitable pipes and are adapted to simultaneously project gas streams into engagement with the adjacent beams of fibers.

The central beam of fibers 153 is adapted to oscillate in directions opposite to the direction of oscillation of the beams 152 and 154 of fibers. Thus an air stream from nozzle 161 causes the beam of fibers 153 to be moved in a lefthand direction and the air streams from nozzles 160 and 162 move the beams 152 and 154 in a righthand direction as viewed in Figure 9.

A second group of nozzles comprising individual nozzles 165, 166 and 167 are arranged to discharge air streams or air blasts against the beams of fibers to move the fibers transversely in opposite directions. The air blasts from nozzles 165 and 167 move the beams of fibers 152 and 154 in a lefthand direction, while the blast from nozzle 166 engages and moves the intermediate beam of fibers 153 in the opposite direction as viewed in Figure 9. The alternate operation of the two groups of nozzles in producing air blasts may be controlled by a rotary valve construction 100' of the character shown at 100 in Figures 4 and 5 in order to bring the blasts into operation in the proper phase relation with the oscillating beams in order to reciprocate the beams of fibers over the transverse area of the collecting zone or conveyor 150.

While three beams of fibers are illustrated in Figure 9, it is to be understood that additional beams of fibers may be utilized arranged lengthwise of the collecting conveyor in forming a mat of laminated character.

The arrangement of beams of fibers shown in Figure 8 may be combined with the arrangement of beams of fibers shown in Figure 9 for producing a mat of substantial thickness and of exceptional width. By a proper timing or synchronization of the air jets or air streams utilized for oscillating or reciprocating the beams of fibers with speed of movement of the collecting conveyor, the quantity of fibers deposited in a given linear dimension of mat or the extent of overlap of the successive layers may be determined and controlled and the fibers of the beams deposited upon the collecting surface in substantially uniform thickness.

By modifying the timing or phasing of oscillation of the beam of fibers, different patterns of orientation of the fibers in a mat may be attained. By controlling the rfequency and amplitude of oscillation of the beam or beams of fibers during the deposition or collection of fibers upon a moving conveyor, a mat of laminar character may be formed of substantially uniform thickness throughout its entire area or a mat may be formed having linear zones of greater thickness.

The method of the invention carried on in the manner herein described facilitates the oscillation or reciprocation of a beam or beams of fibers while in suspended condition by subjecting the beam or beams of fibers to properly directed forces or zones of differential pressures resulting in moving the beam or beams in undulating paths to effect controlled distribution of the fibers over a predetermined area.

It is apparent that, within the scope of the invention, modifications and different arrangements may be made other than is herein disclosed, and the present disclosure is illustrative merely, the invention comprehending all variations thereof.

We claim:

1. A method of forming and collecting fibers including the steps of applying centrifugal forces to a stream of heat-softened fiber-forming material to form the material into elongated bodies, engaging the bodies by a gaseous blast in an annular zone and thereby attenuating the bodies to fine fibers oriented in hollow formation, establishing differential pressure zones adjacent the hollow formation of fibers for collapsing the hollow formation and reciprocating the collapsed formation in lateral directions, and collecting the collapsed formation of fibers in superposed layers to form a mat.

2. A method of forming fibrous mats including the steps of applying centrifugal forces to heat-softened mineral material forming the material into individual bodies, engaging the bodies in an annular zone by a gaseous blast thereby attenuating the bodies to fibers whereby the fibers move away from the attenuating zone in a hollow beam formation, directing intermittently operable forces acting on the beam of fibers to collapse and flatten the beam of fibers, and collecting the fibers of the flattened beam to form a mat.

3. A method of forming and processing fibers including the steps of applying centrifugal forces to a stream of heat-softened fiber-forming material to form the material into elongated bodies, engaging the bodies by a gaseous blast in an annular zone and thereby attenuating the bodies to fine fibers oriented in tubular formation, directing an air stream toward the tubular formation of fibers for changing the path of traverse of the tubular formation of fibers to distribute the fibers over a comparatively large area, and collecting the fibers in overlapping groups on a collecting surface.

4. A method of forming fibrous mats including the steps of applying centrifugal forces to heat-softened mineral material forming the material into outwardly moving bodies, engaging the bodies in an annular zone by a gaseous blast thereby attenuating the bodies to fibers moving away from the attenuating blast in a tubular formation, directing air streams intermittently against opposed zones of the tubular formation of fibers to collapse and flatten the tubular formation and oscillate the flattened formation of fibers, and collecting the fibers of the flattened formation in partially overlapping layers to form a laminar-like mat.

5. A method of processing fibers attenuated from heat-softened mineral materials including advancing a tubularly shaped group of attenuated fibers in the general direction of its length through an enclosure, directing the group of fibers through zones of differential pressures in the enclosure for distributing the fibers of the group over a substantial area, and collecting the fibers of the group in a mass of substantially uniform thickness throughout the area of distribution of the fibers.

6. A method of processing fibers attenuated from heat-softened mineral materials including advancing a hollow beam of fibers in the general direction of its length, engaging the advancing beam of fibers intermittently by forces acting alternately in different directions for imparting undulating movement to and collapsing the hollow beam to form a layer of fibers, and collecting the layer of fibers on a moving surface during undulating movement of the beam whereby the layer of fibers is accumulated on the surface in overlapping folds to form a multilayer mat.

7. A method of processing fibers attenuated from heat-softened mineral materials including the steps of advancing a hollow beam of fibers in the general direction of its length, applying a coating material to the advancing beam of fibers, engaging the advancing beam of fibers intermittently by forces acting in directions to change the path of traverse of the beam and collapse the beam, and collecting the collapsed beam of fibers on a moving surface in a mass of substantially uniform thickness throughout the fiber collecting area of the surface.

8. A method of processing fibers attenuated from heat-softened mineral materials including the steps of advancing a tubularly shaped group of fibers in the general direction of its length, applying a coating material to the advancing group of fibers, engaging the advancing coated group of fibers intermittently by forces acting alternately in different directions for imparting undulating movement to and partially collapsing the tubularly shaped group of fibers, and collecting the fibers on a moving surface during undulating movement of the group whereby the fibers are accumulated on the surface in overlapping layers to form a multi-layer mat.

9. A method of processing fibers attenuated from heat-softened mineral materials including the steps of advancing a hollow beam of fibers in the general direction of its length, applying a bonding material to the advancing group of fibers, engaging the advancing beam of fibers intermittently by forces acting in directions to impart undulating movement to and flatten the beam of fibers, collecting the fibers of the flattened beam on a surface in a mat of substantially uniform thickness, and treating the mat to cure the bonding material.

10. A method of processing fibers attenuated from heat-softened mineral materials including the steps of concomitantly advancing a plurality of tubular beams of fibers arranged in adjacent relation, engaging the advancing beams of fibers intermittently by forces acting alternately in different directions for collapsing the beams of fibers and controlling the paths of movement of the collapsed beams of fibers, and collecting the fibers of the collapsed beams on a moving surface in partially overlapping layers to form a mat.

11. A method of processing fibers including the steps of attenuating heat-softened material to fibers in individual annular zones forming hollow beams of fibers arranged in side-by-side relation, directing gaseous blasts alternately against zones of the beams of fibers for reciprocating the beams of fibers in transverse directions, and collecting the fibers of the beams concomitantly with the reciprocating movements thereof whereby the beams of fibers are accumulated in superposed relation to form a laminar-like mat.

12. A method of processing fibers including the steps of attenuating heat-softened material to fibers in individual annular zones forming hollow beams of fibers arranged in longitudinal series relation, intermittently engaging the beams with blasts of air for flattening the beams of fibers and oscillating the flattened beams in transverse directions, and collecting the flattened beams of fibers at a collecting zone whereby portions of the flattened beams are overlapped to form a laminar-like mat of the fibers.

13. Apparatus of the character disclosed, in combination, means for forming fibers into a hollow beam, means for projecting a fluid medium adjacent spaced zones of the beam of fibers to flatten the beam and concomitantly cause reciprocatory movements thereof, a fiber collecting surface, and means for moving the fiber collecting surface whereby the flattened beam of fibers is collected in overlapping folds during reciprocatory movements of the beam of fibers to form a mat.

14. Apparatus for processing fibers including, in combination, means for forming fibers in a hollow beam, an enclosure surrounding the beam of fibers, means for establishing differential pressures in spaced zones in said enclosure adjacent the beam for reciprocating the beam of fibers in transverse directions, a fiber collecting surface, and means for moving the fiber collecting surface whereby fibers from the beam are collected during reciprocatory movements of the beam to form a mat.

15. Apparatus for processing fibers including, in combination, means for forming fibers in a plurality of hollow beams, means for establishing differential pressures adjacent the beams of fibers for collapsing and flattening the beams and concomitantly reciprocating the flattened beams of fibers in lateral directions, and means for collecting the laterally reciprocating flattened beams of fibers into a fibrous mat.

16. Apparatus for processing fibers including, in combination, means for forming fibers in a hollow configuration, an enclosure through which the beam of fibers is projected, nozzles arranged in said enclosure in diametrically opposed positions relative to the beam of fibers, means for intermittently projecting gas streams from said nozzles to reciprocate the beam of fibers, a fiber collecting surface, and means for moving the fiber collecting surface whereby the beam of fibers is lapped in successive folds upon itself on the fiber collecting surface to form a multilayer mat of substantially uniform thickness.

17. Apparatus for processing fibers including, in combination, means for forming fibers in a hollow configuration, an enclosure through which the beam of fibers is projected, means for directing a coating material onto the fibers of the beam, nozzles arranged in diametrically opposed positions in the enclosure relative to the beam of fibers, means for intermittently projecting gas streams from said nozzles to oscillate the beam over a substantial area, a fiber collecting surface, and means for moving the fiber collecting surface whereby the beam of fibers is generally folded upon itself in echelon relation to form a multilayer mat.

18. A method of forming and processing fibers including the steps of attenuating bodies of heat-softened fiber-forming material into fibers by an attenuating blast and conveying the fibers by the blast as a hollow beam, flowing the beam of fibers downwardly toward a collecting surface, collapsing and flattening the beam and simultaneously translating the beam alternately in opposite directions, and laying the collapsed beam back and forth on the collecting surface to form a multi-layer mat.

19. Apparatus of the character disclosed, in combination with means for forming fibers into a tubular beam moving in the direction of its length, an enclosure surrounding the tubular beam, nozzles disposed within the enclosure and adjacent the beam of fibers, means for intermittently projecting blasts of air from the nozzles in lateral directions toward the beam of fibers to cause undulating movement of the beam in a direction normal to its length over a width greater than the diameter of the beam, a fiber collecting surface and means for advancing the fiber collecting surface whereby the fibers of the undulating beam are collected to form a mat of a width greater than the diameter of the beam.

References Cited in the file of this patent

UNITED STATES PATENTS

| 2,624,912 | Heymes et al. | June 13, 1953 |
| 2,736,362 | Slayter et al. | Feb. 28, 1956 |

FOREIGN PATENTS

| 709,612 | Great Britain | May 26, 1953 |